March 31, 1931. J. C. BERGNER 1,798,582
EDIBLE PRODUCT FORMING MACHINE
Filed Oct. 26, 1922 2 Sheets-Sheet 1
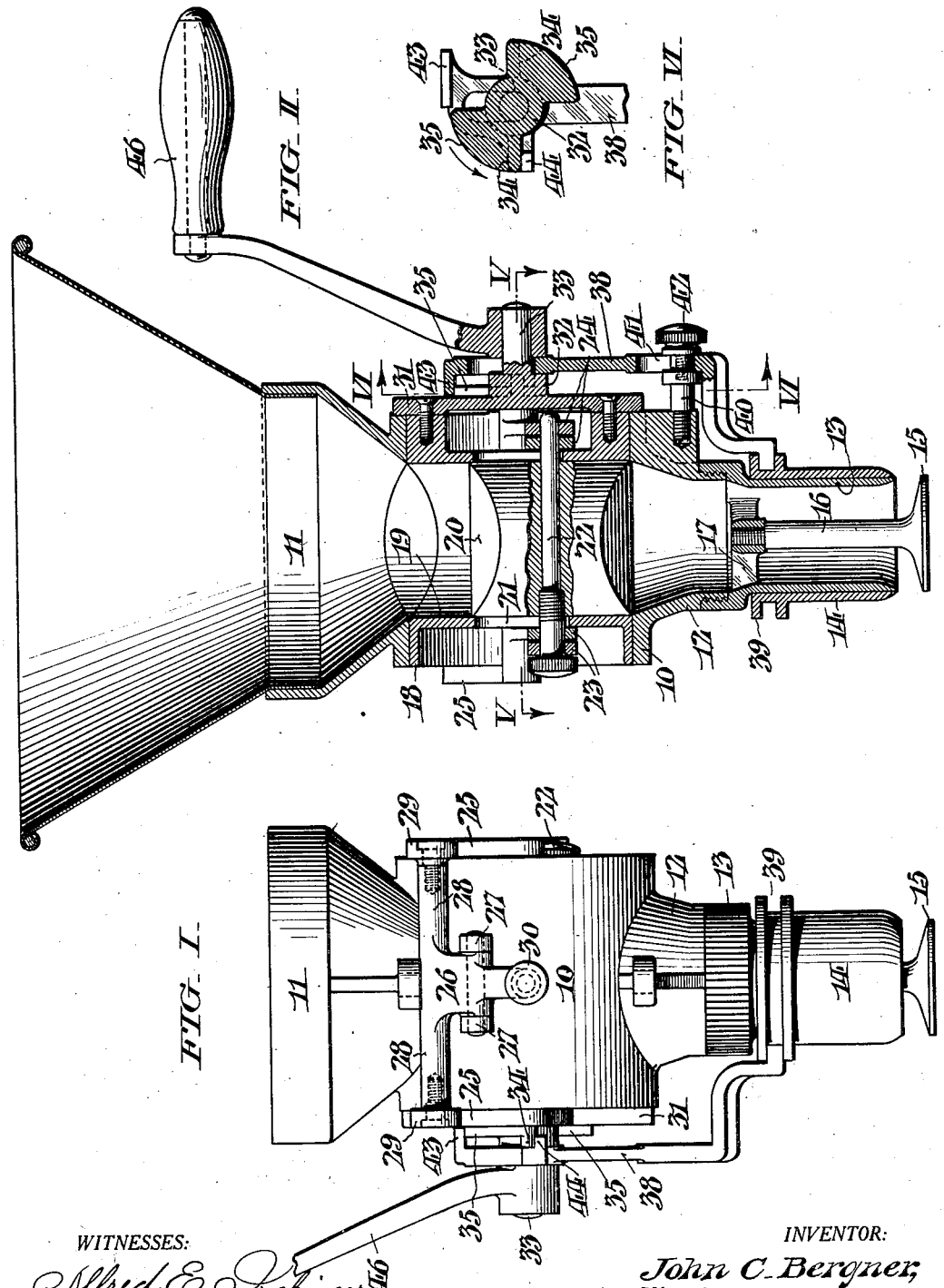
INVENTOR:
John C. Bergner

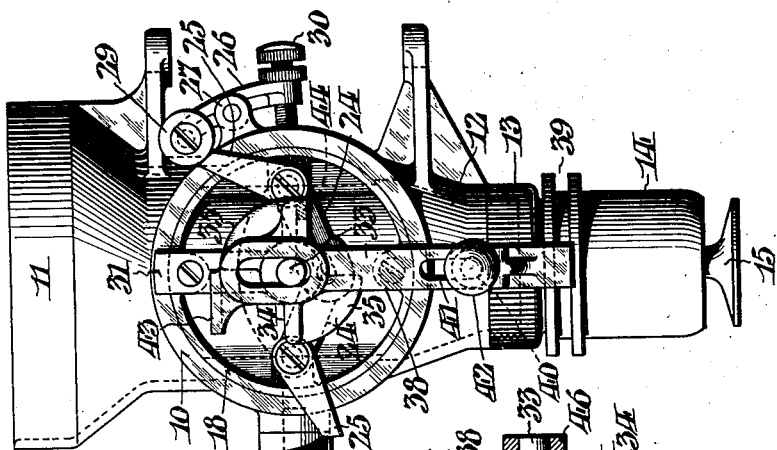

Patented Mar. 31, 1931

1,798,582

UNITED STATES PATENT OFFICE

JOHN CHRISTIAN BERGNER, OF LANSDOWNE, PENNSYLVANIA, ASSIGNOR TO DOUGHNUT MACHINE CORPORATION, A CORPORATION OF NEW YORK

EDIBLE-PRODUCT-FORMING MACHINE

Application filed October 26, 1922. Serial No. 597,142.

This invention relates to the manufacture of alimentary products and more particularly to mechanical devices for forming paste or dough into desirable formations for cooking, and the principal object is to improve that type of machine which embodies a rotor operating in an enclosure and carrying a transversely movable displacing element designed, during prescribed movement of the rotor, to alternately isolate a portion of the plastic material from a supplying mass and force the same through a plasmatic element to develop a formation of the desired configuration.

Among the improvements contemplated by the present invention is the provision of a novel means in a machine of the character stated for varying the mass of the unit quantities of material extruded so as to permit control or variation in the size of the extruded formations, the mechanism whereby this function is performed having been designed with a view to permitting such alterative adjustments while the machine is in full operation and without effecting, except as to degree, the normal cooperative relation or reducing the efficient operation of the several parts, and without interrupting the performance of the machine to any extent whatsoever.

Another object of the invention is to provide an improved means for operating the plasmatic element or die and for coordinating the operative intervals of the latter with respect to the extruding means, as well as to simplify and render positive the operation of this portion of the mechanism.

In addition to the foregoing this invention comprehends improvements in the details of construction and arrangement of the correlated parts whereby other advantages are secured, such as accessibility to the parts, and inherent competency for disassembly when cleaning, in a manner to be hereinafter set forth and particularly pointed out in the appended claims.

In the accompanying drawings forming part of this application; Fig. I is a view in elevation of a doughnut cutter embodying my improvements.

Fig. II is a view of the machine in vertical section taken through a central plane.

Fig. III is a view of the machine in end elevation.

Fig. IV is a similar view showing the machine as viewed from the opposite end.

Fig. V is a view in horizontal section taken on the line V—V of Fig. II.

Fig. VI is a detail view in section taken on the line VI—VI of Fig. II; and

Fig. VII is a fragmentary view in perspective of the die sleeve operating bar.

I have illustrated in the accompanying drawings my invention as embodied in a machine for cutting or forming doughnuts or annular dough formation, being particularly adapted to a machine of this character, although it will be apparent that the several elements and combinations thereof constituting my invention may be applicable with advantageous results to other forms of pastry machinery or the like.

Proceeding to a description of the drawings, 10 designates a cylindrical casing, open preferably at either end and surmounted by an integral formation constituting a hopper 11 into which a supply of the material in plastic form is deposited for feeding to the casing. A depending extension 12 is formed with the casing constituting a conduit which is in communicaton with the interior of the casing and shown as aligned with the throat of the hopper. A separable conduit extension 13 is applied to the end of the conduit 12 to form a continuation thereof and to receive an embracing sleeve 14 forming the movable element of the die or plasmatic device, the stationary portion of which consists of a discous member 15 cooperating with the lower end of the extension 13 from which it is spaced to form an annular orifice through which the plastic material is extruded laterally through the deflecting action of the discous member, and the extrusions intermittently severed by engagement of the lower or cutting edge of the sleeve with the peripheral edge of the discous member, when said sleeve is lowered in a manner to be described. The discous element 15 is formed upon a stem 16 which is centralized within the conduit extension 13 and supported therefrom through the aid of an integral spider 17 which permits the material to descend by passage through the interstices thereof.

The rotor is in the form of a cylinder 18, having a transverse passage 19 in which the displacement element or plunger 20 is fitted for oscillatory movement. The ends of the rotor are formed with diametrical slots 21 and the plunger with a registering channel to receive a pin 22 having an enlarged and threaded end to fit the appropriately threaded enlargement of the channel so that the pin may be readily retained in place and quickly removed when necessary.

The plunger is operated upon rotation of the rotor by a novel means constituting an essential feature of the present invention and consisting of two pairs of arms 23 and 24 located at opposite ends of the cylinder, the remote ends of the arms of each pair being pivotally mounted in diametrically opposed relation upon one end of the cylinder with the adjacent ends slotted to receive the cooperative and adjacent end of the pin 22 so that the plunger may be shifted when the arms are swung alternately from side to side. Such movement is induced by virtue of trip fingers 25 with which each arm is provided with one, in offset relation and extending beyond the margin of the cylinder to lap the ends of the casing. A tripping means is provided which includes an adjustable bracket arm 26 mounted upon the outer side of the casing and pivotally supported at an intermediate point between spaced ears 27 formed with the casing. One end of the arm is formed with lateral extensions 28 each carrying a tripping roller 29 disposing one of the latter at each end of the casing in the path of movement of their correlated trip fingers. The opposite end of the rocking arm 26 is tapped to receive an adjusting screw 30 which contacts with the side of the casing and is designed upon rotative adjustment to rock the arm 26 about its fulcrum and thereby move the tripping rollers toward or away from the rotative axis of the cylinder and hence vary the degree of swinging movement imparted to the trip fingers upon engagement therewith.

Upon one end of the cylinder, or upon the end opposite to that into which the pin 22 is inserted, there is secured in any convenient manner a diametrical plate 31 having a boss 32 and a stud 33 formed as axial continuations of the cylinder axis. The boss 32 is formed with a pair of oppositely extending die operating lugs 34, each of which is formed with an arcuate trailing fin 35, the latter being formed in concentric relation to the cylinder axis, each fin being of a length equal approximate to an angular distance of ninety degrees for a purpose to be presently noted. The die operating means further comprises a bar 38 having one end slotted to receive the stud 33 and the opposite end extended downward and its extremity lodged within a grooved enlargement 39 of the die sleeve 14. The bar is guided and held in operative relation to the machine by means of a stud 40 which projects from the extension 12 of the casing and enters a slot 41 formed in the bar. A flange is formed on the stud to engage one face of the bar and the stud end is threaded to receive a flanged screw 42 functioning to engage the outer side of the bar and constitute a releasable retaining means. The bar 38 is formed with a pair of oppositely directed ledges 43 and 44 located respectively above and below the boss 32 for successive engagement by the lugs 34, the upper ledge 43 being of a length to extend from the axial center of the bar 38 to a point beyond the side in a manner calculated to ensure proper cooperation immediately thereafter with the trailing fins 35, while the lower ledge 44 is modified to the extent of spacing the same from the bar so as to be engaged only by the lugs 34. The advantages of this construction will become apparent from subsequent description.

The machine described above is particularly adapted for hand operation by applying a crank arm and handle 46 to the stud 33, although the machine may be power driven by embodying any suitable mechanical expedient therein for the purpose.

Doughnut cutters are also incorporated in automatic cookers adapted to receive the dough extrusions and to automatically cook and deliver the formations through means operated by a prime mover, such as an electric motor. The doughnut cutter described above and embodying my improvements lends itself particularly well to embodiment in automatic cookers as its mode of operation may be coordinated with the mechanism of the cooker with such facility as to form a thoroughly cooperative assembly that is calculated to perform the necessary operations in an orderly and efficient manner to convert the plastic mass of dough into edible products.

Whatever may be the adopted mode of driving the machine its operation is as follows: The plastic mass in the hopper 11 feeds downward by gravity and during rotation of the rotor the fingers 25 at each side of the cylinder are alternately tripped causing the plunger to effect a complete reciprocating cycle or two movements during each revolution of the rotor, such movements occurring when the cylinder bore 19 is aligned with the hopper and conduit passages. Hence, the reciprocating movement of the plunger is always downward with respect to the casing. During downward movement of the plunger a unit quantity of material descends into the cylinder bore 19 to fill the cavity created by plunger movement, the descent of the material being induced partly by gravity influence and partly by suction. Upon subsequent rotation of the cylinder the material in the cavity is isolated from the mass and carried downward and brought opposite the conduit passage so that upon the next reciprocatory movement of the plunger the material is forced from the cavity and into the conduit, the plunger movement simultaneously creating the cavity again for isolating another quantity of material. The act of forcing the material through the conduit and extension causes the same to extrude through the die orifice in an annular formation the size of which is controlled by the capacity of the cavity above the plunger, the capacity of the cavity being in turn controlled by the extent of plunger movement. Following the completion of a plunger movement one of the die operating lugs 34 will engage the lower ledge 44 and cause downward movement of the bar 38, which movement is in turn communicated to the cutting sleeve 14 so as to lower the same and sever the extrusion in the manner already described. It will be noted that during this movement of the parts the end of the lug 34 will ride along the face of the lower ledge until the inner edge of the said ledge is reached whereupon the lug slips off the ledge. The bar 38 is now free to move upward and its elevation is accomplished by the lug 34 opposite to the lug which has just escaped the lower ledge, by engaging the under side of the upper ledge 43. The bar is thereby raised to its full height and retained by the trailing fin 35 which rides along the ledge until the rear edge 37 of the web passes beyond the ledge permitting the bar to descend under the influence of the opposed lug 34 in the manner described. It will be noted that the lower ledge 44 is narrower than the upper ledge 43. This provision is for the purpose of permitting the lower ledge to escape engagement with the fins 35 so that there may be no interference to the quick return of the bar 38 to upper position as soon as the lug 34 releases the lower ledge.

As a result of this construction the cutting sleeve 14 is caused to execute a quick substantially instantaneous descent and return when severing the extrusion, and the sleeve retained in elevated position for the maximum period of each cycle of operation, permitting the die orifice to remain open for the free and uninterrupted discharge of the material.

It will be apparent that adjustment of the mechanism may be readily performed while the machine is in operation by merely rotating the screw 30 in one direction or the other, and that the operative relation of the parts remains fixed so that there is no possibility of derangement of the mechanism during adjustment, the only effect of which is to vary the intervals of engagement between the parts.

The support of the machine may be effected by means of lugs cast with the casing for connection to a swinging arm or the like permitting the machine to be suspended over a cooking receptacle so that the dough formation may fall thereinto. Obviously any other arrangement for the support of the machine may be devised to embody the same in a particular kind of cooking arrangement. To steady the machine during operation a handle 48 may be affixed thereto as shown.

By virtue of the construction shown the quick dissociation of the parts for cleaning is readily accomplished. Thus, the pin 22 is first unscrewed and withdrawn. This act permits the trip fingers 25 at the pin withdrawing end of the cylinder to be thrown to the center so as to unlap the margin of the casing and permit the cylinder to be withdrawn after the thumb screw 42 is removed. The plunger 20 is now free to drop from its passage. Owing to the small number of parts and the simplicity of their formation cleaning may be readily effected and the parts quickly returned to assembled relation. It is to be noted that when the machine is assembled the only means provided to prevent endwise dislodgement of the cylinder are the trip fingers 25 which normally extend beyond the perimeter of the casing.

The bar 38 by virtue of its connection to the stud 33 is removed with the cylinder, and the removed assembly consisting of the cylinder, tripping members, plate 31, bar 38 and crank arm constitute a unit which includes all the working parts retained in operative relation, so that the removal of the cylinder for cleaning does not entail such complete dissociation of the parts as would render the reassembly of the machine a tedious or lengthy operation, nor destroy the adjustment of the tripping element 26 to which the latter has been set prior to the removal of the cylinder, so that the product will be as uniform after reassembly as before.

As a means for constantly maintaining the end of adjusting screw 30 in yielding contact with the casing, a spring 47 is interposed beneath the roller bracket arm 26 at a point above the fulcrum of the latter, see Figure III. This provision tends to prevent rebounding of the roller arm assembly through impact of the fingers 25 during rapid rotation of the machine and thus minimizes unnecessary noises incidental to operation.

Having thus described my invention, I claim:

1. In aliment forming mechanism, a forming element, means to feed material thereto in unit portions including a rotor and a displacing piston plunger carried thereby, means operable by prescribed rotor movement to actuate the displacing plunger, and stationarily supported means enabling regulatory control of the displacing plunger to vary the quantity in the unit portions without necessity for stopping the mechanism.

2. In aliment forming mechanism, a forming element, means to feed material thereto in unit portions including a rotor and a movable displacement piston plunger carried thereby, means operable upon prescribed rotor movement to throw the displacement plunger, and stationarily supported means capable of adjustment during rotor movement to vary the throw of the displacement plunger and thereby alter the quantity in the unit portions.

3. In aliment forming mechanism, a forming element, means to feed material thereto in unit portions including a rotor and a movable displacement element, cooperative stationary and movable trip members functional upon prescribed rotor movement to throw the displacement element, and means independent of the moving parts of the mechanism enabling adjustment of the stationary trip member to vary the throw of the displacement element and thereby alter the quantity in the unit portions without necessity for stopping the mechanism.

4. In aliment forming mechanism a forming element, means to feed material thereto in unit portions including a rotor and a displacement element carried thereby, operating members on the rotor to throw the displacement element, a trip element to engage and actuate said operating members, and means independent of the moving parts of the mechanism enabling adjustment of the tripping element to alter the relation thereof with respect to the operating members for the purpose of varying the throw of said members and the quantity in the unit portions without necessity for stopping the mechanism.

5. In aliment forming mechanism, a forming element, means to feed material thereto in unit portions including a rotor and displacement device carried thereby, a pair of operating members carried by the rotor having separate connections to the displacement device, and a tripping element engaging the members alternately to throw the displacement device.

6. In aliment forming mechanism, a rotor and movable displacement device carried thereby, operating members also carried by the rotor engaging the displacement device at opposite sides, and tripping means engaging the members simultaneously during rotor movement to throw the displacement device with intervening dwell periods.

7. In aliment forming mechanism, a rotor and movable displacement device carried thereby, operating members engaging the displacement device at opposed points to balance the moving effort, a rocking arm, tripping elements carried by the arm to engage said members simultaneously during rotor movement to throw the displacement device, and a graduating adjusting means to rock the arm and vary the degree of said engagement.

8. In aliment forming mechanism, a rotor and displacement device carried thereby, an operating member carried by the rotor to throw the displacement device, and a tripping means including an arm fulcrummed centrally having one end in the path of movement of said member, and means engaging the other end to rock the arm and vary the degree of engagement between said arm and member.

9. In aliment forming mechanism, a rotor and displacement device carried thereby and movable transversely, an operating member fulcrummed at a point intermediate its ends, upon the end of the rotor for rocking movement in a plane parallel to the plan of rotor movement, and having its inner end engaging the displacement device, and a relatively stationary tripping element in the path of movement of the opposite end of said member.

10. In aliment forming mechanism, a casing including a hopper, a forming element, a rotor in the casing having a transverse passage, a plunger operating in the passage, a pair of operating members fulcrummed upon each end of the rotor, each pair having their inner ends operatively connected to the plunger, an arm fulcrummed upon the casing having diverging extensions on one terminal, rollers carried upon said terminals located in the path of movement of the free ends of said operating members, and a screw threaded in the opposite end of said arm and engaging the casing to rock the arm.

11. In aliment forming mechanism, a rotor and plunger carried thereby, a removable pin carried by the plunger and having protruding ends, operating members carried by the rotor and having releasable connection to the pin ends, and a tripping means to engage the operating members, whereby the plunger may be removed when the pin is withdrawn.

12. In aliment forming mechanism, a casing, a rotor operating in the casing and removable endwise, a plunger carried by the rotor, operating members carried by the rotor having releasable connection to the plunger and tripping ends normally lapping the wall of the casing to prevent withdrawal of the rotor but permitting such withdrawal when the plunger connections are broken, and tripping means to engage said tripping ends of the members.

13. In aliment forming mechanism, a forming means including a stationary deflecting member and a cooperative movable cutting sleeve, a rotary means to force material through the forming means, lugs carried by the rotary means, and means engageable by said lugs to effect prescribed sleeve movement.

14. In aliment forming mechanism, a forming means including a movable element, a rotary feeding means, a reciprocating member for actuating said movable element, lugs movable with the rotary feeding means for reciprocating said member, and means cooperative between the lugs and the member to effect quick reciprocation of the latter in severing an extrusion, and to maintain said member retracted and the forming means open for the maximum period of each operating cycle to permit free and uninterrupted discharge therethrough.

15. In aliment forming mechanism, a forming means including a movable element, a rotary feeding means, a reciprocating member for actuating said element, lugs movable with the rotary feeding means, opposed cooperative ledges carried by the member engageable by said lugs to reciprocate the member, and trailing fins formed with the lugs to engage one of said ledges subsequent to reciprocation of the member to maintain the latter retracted and the forming means open for the maximum period of each operating cycle to permit free and uninterrupted discharge therethrough.

16. In aliment forming mechanism, a forming means including a movable element, a rotary means to feed material to the means including a shaft, a bar to operate said movable element, having a slot to receive the shaft, ledges carried by the bar at opposite sides of the shaft, and lugs rotatable with said rotary feed to engage said lugs and cause reciprocatory movement of said bar.

17. In aliment forming mechanism, a casing having a cylinder bore, a cylinder operating therein and slidable endwise into the casing, a plate secured to one end of the cylinder limiting entering movement, an operating shaft carried by the plate, a plunger operating in the cylinder, operating members for the plunger carried by the cylinder and movable subsequent to insertion of the cylinder to lap the casing walls and prevent withdrawal of the cylinder, and tripping means to actuate said operating members.

In testimony whereof, I have hereunto signed my name at Philadelphia, Pennsylvania, this 24th day of October, 1922.

JOHN CHRISTIAN BERGNER.